United States Patent [19]
Blair

[11] 3,780,531
[45] Dec. 25, 1973

[54] HYDROTURBINE

[75] Inventor: William G. Blair, Bolusia, Fla.

[73] Assignee: Blair Engineering, Inc., Ormond Beach, Fla.

[22] Filed: Apr. 23, 1971

[21] Appl. No.: 136,721

[52] U.S. Cl............... 60/40, 60/108, 137/625.3, 252/282
[51] Int. Cl............... F01k 25/04, F01k 13/00
[58] Field of Search.............. 60/39, 40, 105; 137/625.3; 251/282

[56] References Cited
UNITED STATES PATENTS

| | | | |
|---|---|---|---|
| 2,989,081 | 6/1961 | Olsen | 137/625.37 |
| 726,770 | 4/1903 | Siple | 60/39 |
| 1,133,988 | 3/1915 | Mack | 60/40 |
| 1,712,245 | 5/1929 | Blyston | 137/625.3 X |
| 2,677,387 | 5/1954 | Crawford | 137/625.3 X |
| 3,022,235 | 2/1962 | Brown et al. | 60/105 X |
| 3,112,764 | 12/1963 | Anderson et al. | 137/625.3 X |

FOREIGN PATENTS OR APPLICATIONS

| | | | |
|---|---|---|---|
| 9,759 | 5/1894 | Great Britain | 60/40 |
| 13,899 | 6/1904 | Great Britain | 60/40 |

Primary Examiner—Martin P. Schwadron
Assistant Examiner—Allen M. Ostrager
Attorney—J. H. Slough

[57] ABSTRACT

There is disclosed herein a hydroturbine apparatus in which a rotary engine or turbine having radially disposed blades is driven by an injector of the type which entrains water in pressurized steam traveling at high velocity and projects the same against the blades.

2 Claims, 7 Drawing Figures

INVENTOR
William G. Blair
BY J.H. Slough
J. H. SLOUGH
ATTORNEY

HYDROTURBINE

This invention relates to rotary type engines or turbines adapted to be actuated by a current of fluid, and particularly to a hydroturbine driven by an injector of the type in which water or other liquid is propelled by pressurized, high velocity steam.

In the embodiment of the invention herein disclosed, a rotary engine or turbine having radially disposed blades is rotatably driven by an injector which combines water with pressurized, high velocity steam and projects the mixture against the turbine blades. The injector is positioned below the level of a water supply whereby the injector does not lift the water, said water freely flowing into the injector. Throttle means are also provided for controlling the flow of steam to the injector, said throttle means being connected to coact with a spill valve whereby as the throttle is closing, water can bypass the turbine and thereby relieve pressure on the turbine at slower speeds.

It is an object of this invention to provide an improved hydroturbine of simple, efficient, durable construction.

Another object of this invention is to provide an improved hydroturbine driven by a combination of a liquid and steam in an improved manner.

A still further object of the invention is to provide a hydroturbine apparatus having the above characteristics wherein the liquid flows freely into the injector.

Still another object of the invention is to provide a hydroturbine construction wherein as the steam throttle is closed, liquid is automatically bypassed to a reservoir.

Yet another object of the invention is to provide an improved hydroturbine of the type set forth above wherein water is propelled by the steam into the turbine against the blades, and the water and steam mixture exhausted from the turbine is directed through a condenser to a reservoir for recycling in a closed system.

Other objects of the invention will be readily apparent from the following description of one embodiment thereof, as shown in the accompanying drawings in which.

Figure 1:
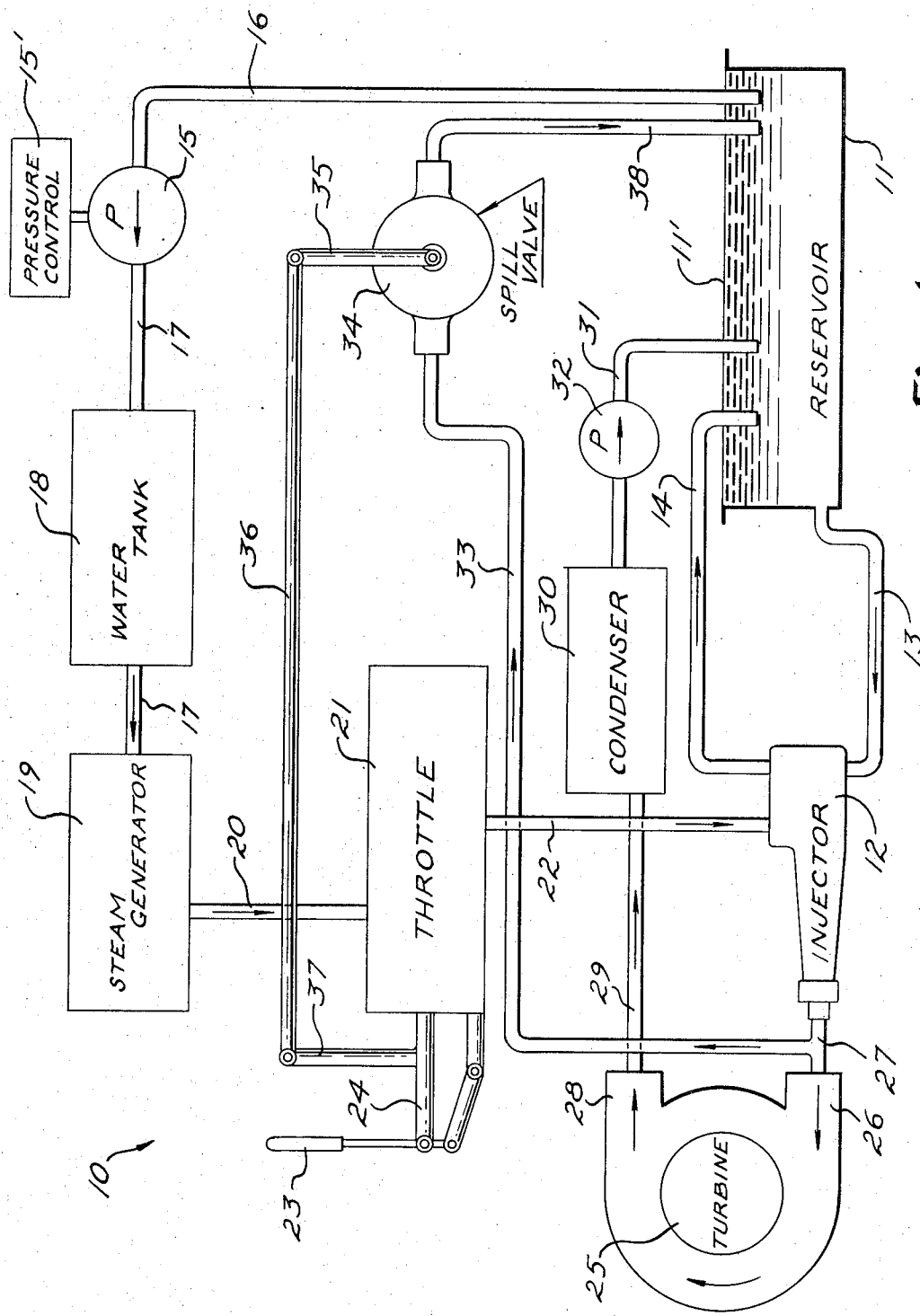
FIG. 1 is a diagrammatic view of the hydroturbine apparatus of this invention in accordance with one preferred embodiment thereof.

Referring now to the drawings in all of which like parts are designated by like reference numerals, FIG. 1 shows in diagrammatic form the various elements of the hydroturbine apparatus and its system of operation. The hydroturbine apparatus or system is generally indicated at 10 and comprises a reservoir 11 containing a supply of preferably distilled water in what is substantially a closed system. An injector 12, hereinlater described in detail, is connected to the reservoir 11 by a line 13, the said injector being positioned below the water level 11' of said reservoir. An overflow line 14 extends from the injector 12 back to said reservoir for the return of excess water.

To provide steam for the injector 12, a pump 15 having pressure control means 15' picks up water from the reservoir 11 through a line 16 and directs the water through line 17 to a water tank 18 of a steam generator 19. The steam is connected from the generator 19 through line 20 to a throttle valve 21 which, in turn, directs the steam through a line 22 to the injector 12. Steam is preferably provided at a pressure of between 200 and 400 pounds.

When the throttle 21 is opened by means of a pivoted handle 23 which actuates a longitudinally slidable piston rod 24, pressurized, high velocity steam enters the injector where water is entrained in the steam and forcefully projected into the intake 26 of a turbine 25 through a line 27. The mixture of steam and water is exhausted from the turbine 25 through an outlet 28 and is directed to a condenser 30 through a line 29. The condenser reduces the mixture once more entirely to water which is then returned to the reservoir through a line 31 by means of a pump 32.

It will be noted that the line 27 leading from the injector 12 to the turbine has an intersecting bypass line 33 directed to a spill valve 34. The spill valve 34 is actuated through a lever 35 the other end of which is connected to one end of a control rod 36. The opposite end of said control rod 36 is connected to a vertical arm 37 carried by the piston rod 24 of the throttle valve 21. The arrangement is such that when the throttle valve is being closed by moving the handle 23 and piston rod 24 toward the left-hand or withdrawn position with respect to the present drawings, the spill valve 34 opens whereby water from the injector can bypass the turbine through the line 33 and the valve 34 at low speeds. The water is directed from said spill valve back to the reservoir 11 through a suitable line 38. As the throttle valve 21 is opened, the spill valve will, of course, be closed whereby water from the injector will be directed into the intake 26 of the turbine 25.

Figure 2:
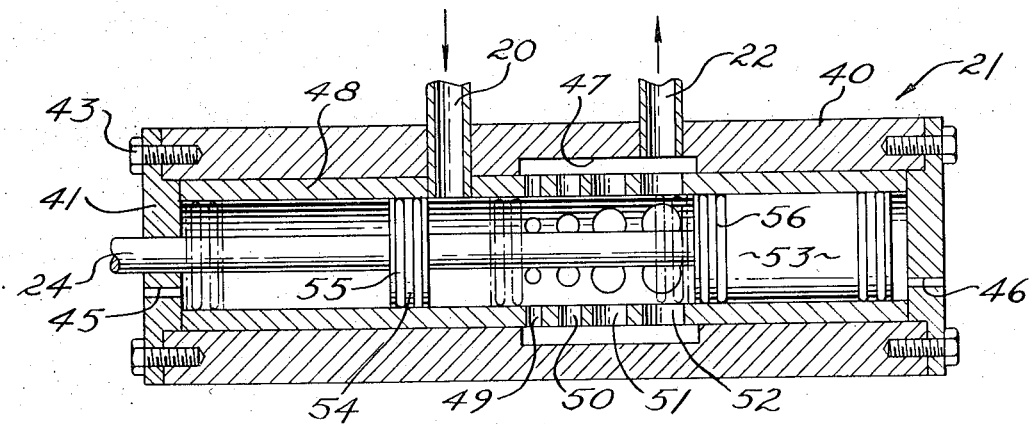
FIG. 2 is an enlarged longitudinal section of the throttle shown diagrammatically in FIG. 1.

The throttle valve 21 is shown in detail in FIG. 2. Said throttle valve comprises a cylindrical housing 40 capped at the ends by end plates 41 and 42 secured to the ends of said housing by any suitable means such as bolts 43 and 44, respectively. Said end plates 41 and 42 are also provided with relief apertures 45 and 46, respectively, to equalize pressure and exhaust trapped air or steam. The inner peripheral surface of the cylindrical housing 40 is provided with an annular recess 47 which extends axially a substantial distance in the medial portion of the valve. A closely fitting sleeve 48 is disposed within said housing and provided with a plurality of apertures 49, 50, 51, and 52 of graduated size positioned in alignment with the recess 47 whereby said recess affords fluid communications between all of said apertures. The line 20 from the steam generator 19 projects through both the cylindrical housing 40 and the sleeve 48 into the interior of said sleeve whereas the outgoing line 22 leading to the injector 12 projects only through the cylindrical housing 40 and opens into the annular recess 47.

The piston rod 44 of the throttle valve 21 carries a substantially elongated spool or cylinder 53 at its innermost end and a shorter spool or cylinder 54 spaced a substantial distance from said spool 53. Both spools are provided with resilient "O" rings 55 seated in annular grooves 56 whereby the spools provide a fluid tight seal with the inner cylindrical wall of the sleeve 48.

The axial dimension of the spool 53 and the distance between said spool 53 and the spool 54 is such that when the valve is in the position illustrated in FIG. 2 (handle 23 and piston rod 24 pushed in the right-hand direction), said valve is fully opened whereby steam enters through the line 20 between the spools 53 and 54 and is freely exhausted through all of the graduated apertures 49–52 into the annular recess 57 and outwardly through the line 22 to the injector 12. As the valve is closed (handle 23 and piston rod 24 moved in the left-hand direction), the elongated spool 53 covers said graduated apertures whereby a progressively smaller amount of steam is allowed to escape through the line 22. The apertures 49–52 are sized whereby the apertures 49 are the smallest, the apertures 50 are the next largest, the apertures 51 are still larger, and the apertures 52 are largest of all. As the spool 53 moves in the left-hand direction it will be obvious that the larger apertures are closed off first whereby the power of the injector can be cut down at a substantially rapid rate when desired. It will be readily understood that when the spool 53 is in its extreme left-hand position as shown in broken lines in FIG. 2, steam from the steam generator and the line 20 is completely cut off from the injector. The steam cannot force the valve open since it is trapped between the two spools 53 and 54 and exerts equal pressure on both spools in the off position.

Figure 3:
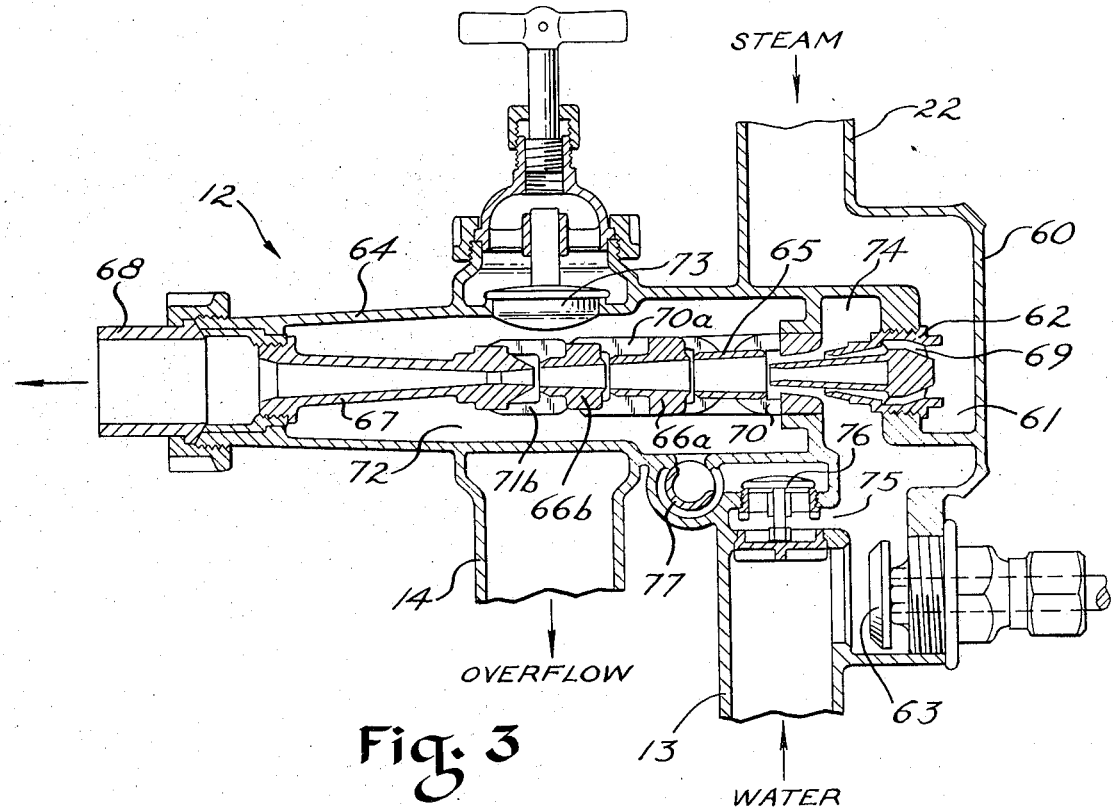
FIG. 3 is an enlarged longitudinal section of the injector shown diagrammatically in FIG. 1.

The injector 12 is shown in detail in FIG. 3, said injector comprising a suitable casting or housing 60 to which water intake line 13, overflow line 14, and the steam intake line 22 are connected in any suitable manner, the means of connection forming no part of the present invention. The housing 60 includes a rear chamber 61 and a steam nozzle 62 mounted in an interior wall portion 60' of said housing defining one side of said chamber. The chamber 61 is connected to the steam line 22, the water line 13 being connected to a water chamber 74 and having a manual valve 63 for ultimately controlling the total volume of water admitted to the injector. A generally cylindrical, slightly forwardly tapering barrel 64 projects forwardly from the chamber 61 and encases an intermediate nozzle 65, a pair of combining nozzles 66a and 66b, and a delivery nozzle 67. The nozzles 65, 66a, 66b, and 67 are disposed successively forwarding of the steam nozzle 62, the delivery nozzle 67 opening into a delivery cylinder 68 from which the water and steam combination is directed to the turbine 25. The intermediate nozzle 65 and the combining nozzles 66a and 66b are progressively stepped down in size in the forward direction, and the delivery nozzle 67 flares outwardly at its forward or exit end.

In operation, steam from the steam generator 19 is admitted to the injector by opening the throttle valve 21 slightly to direct steam through the steam line 22. Steam passes through openings 69 of the steam nozzle 62 and discharges through openings 70, 71a, and 71b in the intermediate and combining nozzles 65, 66a, and 66b, respectively, into an overflow chamber 72 defined by the barrel 64. The steam pressure lifts a heater cock check 73 whereby the steam exits through the overflow line 14. This creates a vacuum in the water chamber 74 surrounding the forward end of the steam nozzle 62 whereby water is literally drawn into the said chamber 74 and on into the overflow chamber 72 to be discharged at the overflow line 14.

When the water appears at the overflow, the throttle 21 is fully opened by pushing the handle 23 all the way to the right as oriented in the drawings, the full force of the steam thereby entering the intermediate nozzle 65 and the combining nozzles 66a and 66b and pushing the water with great force through the delivery nozzle 67 and into the turbine 25.

At very high steam pressure, a vacuum is also produced at the overflow chamber which draws an additional supply of water into the nozzle through a bypass 75 and inlet valve 76 thereby increasing the capacity of the injector under ordinary conditions of operation. This additional supply of water may be turned off completely, if desired, by means of an emergency valve 77.

Those familiar with the art will readily understand the operation of the injector 12. When the steam combines with the water, in and around the intermediate nozzle 65 and the combining nozzles 66a and 66b, the steam is caused to condense thereby producing a vacuum which causes the water to rush in at great velocity and flow through the combining and delivery nozzles, the velocity of the water being augmented by the impact of steam on the back of the liquid column. It will be noted that the outwardly flaring delivery nozzle 67 opens into an even larger chamber in the delivery cylinder 68. In this part of the injector, the stream of water and steam expands thereby losing velocity, and by a well-known hydrodynamic principle, gaining pressure as it enters the turbine 25.

Figure 4:
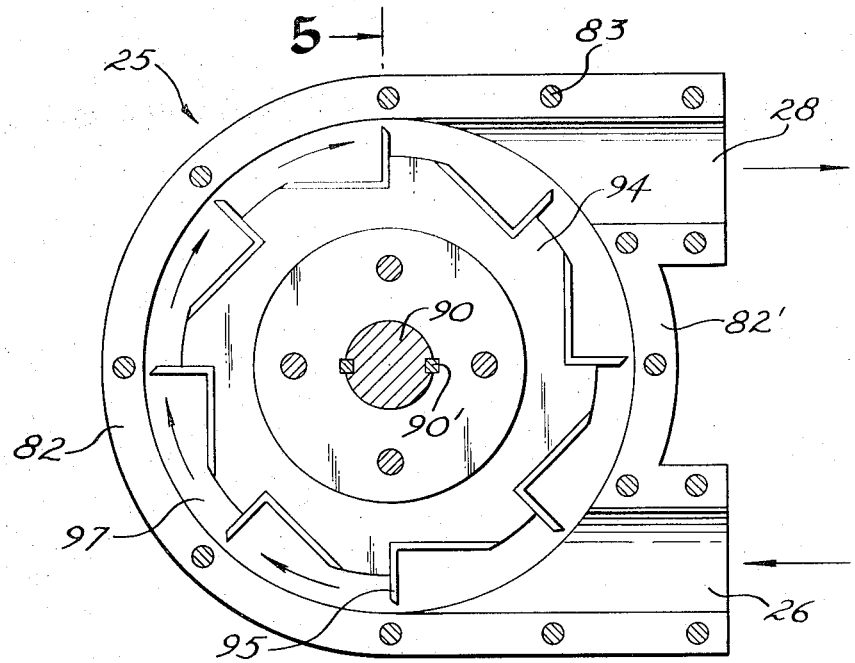
FIG. 4 is an enlarged side view of the turbine shown diagrammatically in FIG. 1 with a side plate removed to show the inner parts thereof, the view being taken generally on the line 4—4 of FIG. 5.
Figure 5:
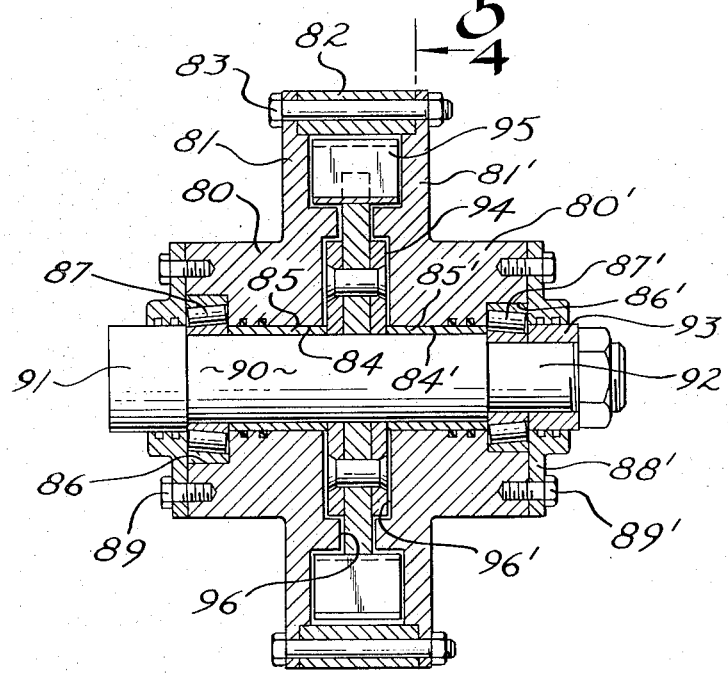
FIG. 5 is a vertical section of the turbine taken substantially along the line 5—5 of FIG. 4.

The turbine 25 is shown in detail in FIGS. 4 and 5. Said turbine comprises a pair of complementary frame sections 80 and 80' having radially outwardly projecting portions 81 and 81', respectively, spaced a fixed distance apart by contoured spacers 82 and 82' and secured together at the outer periphery by suitable bolt and nut assemblies 83. The frame sections 80 and 80' have coaxial central bores 84 and 84' provided with suitable cylindrical liners 85 and 85'. The laterally projecting ends of the frame sections 80 and 80' are provided with annular recesses 86 and 86' which are concentric with the axis of the central bores 84 and 84' and in which are seated suitable roller bearings 87 and 87', respectively. Said roller bearings are retained by suitable end caps 88 and 88' secured to the sections 80 and 80' by bolts 89 and 89', respectively.

A rotor shaft 90 is disposed through the bearings 87 and 87' and liners 85 and 85', one end of said rotor shaft being enlarged as indicated at 91 and surrounded by the end cap 88 whereas the opposite end of said rotor shaft has a reduced portion 92 disposed within a spacer 93 which is surrounded by the end cap 88'.

The rotor shaft 90 carries a turbine rotor 94 secured thereto by a key 90', said turbine rotor including a plurality of radially disposed, circumferentially evenly spaced turbine blades 95. The frame sections 80 and 80' are provided with inner complementary cavities 96 and 96', respectively, whereby the blades 95 are afforded a circular way or path 97 around the inside of the turbine 25. The way or path 97 is intersected by the intake 26 of the outlet 28 which are suitably connected with the injector 12 and the condenser 30, respectively, as hereinbefore described in connection with FIG. 1.

Figure 6:
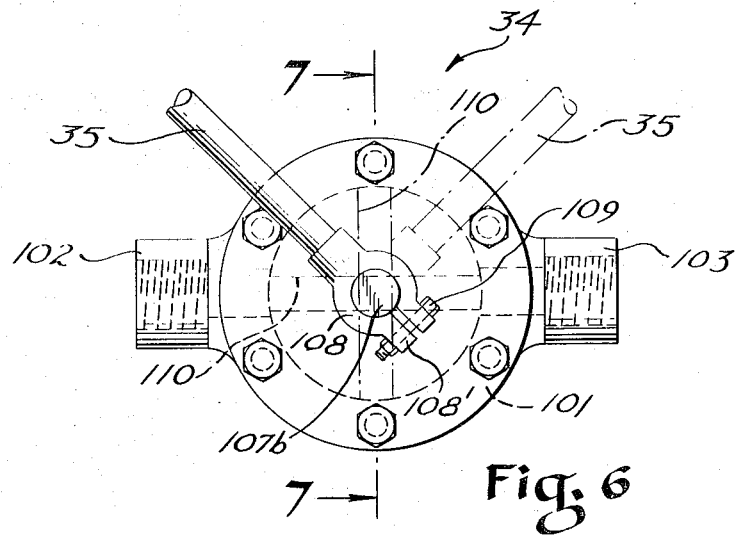
FIG. 6 is an enlarged side elevation of the spill valve shown diagrammatically in FIG. 1.
Figure 7:
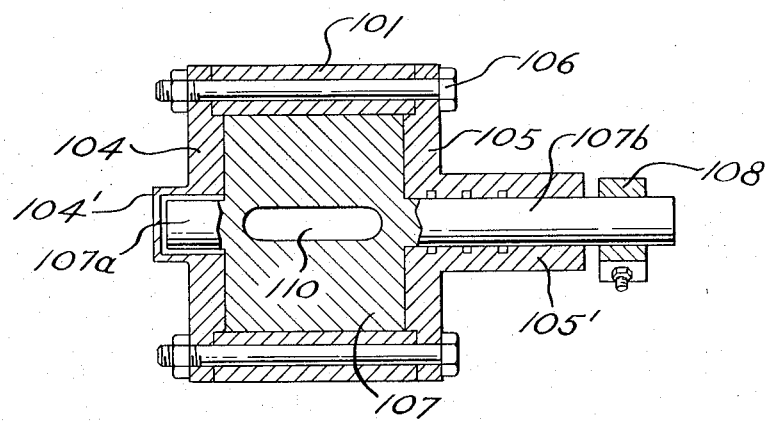
FIG. 7 is a vertical section taken substantially along the line 7—7 of FIG. 6.

Details of the spill valve 34 are disclosed in FIGS. 6 and 7. Said spill valve comprises a cylindrical housing 100 including an annular wall 101 having integral inlet and outlet neck portions 102 and 103, respectively. As shown in FIG. 7, the annular wall 101 is closed at its axially directed ends by end plates 104 and 105 secured to said annular wall by a plurality of circumferentially spaced nut and bolt assemblies 106. The cylindrical housing 100 holds a closely interfitting cylinder 107 having an integral stub shaft 107a projecting into a bearing 104' of the end plate 104. An oppositely directed, coaxial, substantially elongated shaft portion 107b projects in the opposite direction from the cylinder 107 through an integral, elongated bearing portion 105' of the end plate 105. The elongated shaft portion 107b extends outwardly beyond the distal end of the bearing 105', the outermost end portion being engaged by an end clamp 108 carried by one of the lever 35. The end clamp 108 is C-shaped to engage the cylindrical end portion of the shaft portion 107b and is provided with longitudinally extending ears 108' adapted to be adjustably clamped together about the shaft end portion by nut and bolt assembly 109.

The cylinder 107 is provided with a diametric opening 110 adapted to be aligned with the inlet and outlet neck portions 102 and 103 for opening of the spill valve. By pivoting the arm 35 and, therefore, the cylinder 107, the opening 110 can be moved out of alignment with said inlet and outlet whereby the valve is closed. In the full-line showing of the lever 35 and the dotted-line showing of the opening 110 in FIG. 6, the spill valve is shown in its open position; in the phantom or dot-dash line showing of said lever and opening, the valve is shown in its most extreme closed position. This represents the rotation of the cylinder 107 through 90 arcuate degrees, but it will be readily understood that the valve could be opened and closed by substantially less rotation whereby it may be fully adjusted to the stroke of the throttle. Referring again to FIG. 1, it will be readily seen that when the throttle handle 23 is pulled to the left thereby withdrawing the piston rod 24, the spools 53 and 54 of the throttle valve 21 are moved to the broken-line position of FIG. 2 to shut off the steam to the injector at which time the spill valve is opened to allow water to return to the reservoir. This bypass is particularly important where the throttle is not completely closed thereby retaining a vacuum within the injector which draws some water into the system. Under these conditions, the water is effectively bypassed to the reservoir and pressure is relieved from the turbine. When the handle 23 is moved all the way to the right hand direction whereby the throttle is in the full-line position of FIG. 2, the opening 110 will no longer be aligned with the inlet and outlet neck portions 102 and 103 and all of the force generated by the injector will be directed into the turbine.

It will be understood that many changes in details of the invention as herein described and illustrated may be made without, however, departing from the spirit thereof or the scope of the appended claims.

I claim:

1. A hydroturbine apparatus comprising a turbine having radially oriented blades disposed in a circular way; inlet and outlet means intersecting said way; an injector for delivering pressurized steam and water at high velocity against said blades to drive said turbine; means for delivering pressurized steam to said injector including a throttle valve; handle means for actuating said throttle valve; a spill valve connected at an inlet side thereof to a point between said injector and said turbine and at an outlet side thereof to a reservoir; means connecting said handle means with said spill valve to actuate said spill valve in response to actuation of said throttle valve, said spill valve being open during a first portion of the opening movement of said throttle valve and closed thereafter whereby water from said injector automatically bypasses said turbine when said throttle valve is opened to direct only a small amount of steam to said injector and is directed to said turbine thereafter and when said throttle valve is fully opened.

2. A hydroturbine apparatus comprising a turbine having radially oriented blades disposed in a circular way; inlet and outlet means intersecting said way; an injector for delivering pressurized steam and water at high velocity against said blades to drive said turbine; means for delivering pressurized steam to said injector including a throttle valve; said throttle valve comprising a cylindrical housing; a sleeve closely interfitting inside said housing; a plurality of apertures in said sleeve spaced in the axial direction; means defining a recess adjacent to the inner surface of said housing connecting all of said apertures; means providing inlet and outlet steam passages, said inlet passage extending through said housing and said sleeve at a point axially spaced from said apertures and said outlet passage intersecting said recess; a pair of axially slidable spool members carried coaxially by a piston rod within said sleeve, one of said spools being of a length at least equal to the axial distance covered by said apertures and adapted to progressively cover said apertures to control the steam flow; the other of said spools being spaced axially from said one spool a sufficient distance to cause said inlet passage to be disposed between said spools in any position of said throttle valve whereby steam is trapped between the two spools and exerts equal pressure in both axial directions to prevent said steam from forcing said valve to the open position; handle means for actuating said throttle valve; a spill valve connected at an inlet side thereof to a point between said injector and said turbine and at an outlet side thereof to a reservoir; means connecting said handle means with said spill valve to actuate said spill valve in response to actuation of said throttle valve, said spill valve being open during a first portion of the opening movement of said throttle valve and closed thereafter whereby water from said injector automatically bypasses said turbine when said throttle valve is opened to direct only a small amount of steam to said injector and is directed to said turbine thereafter and when said throttle valve is fully opened.

* * * * *